(12) United States Patent
Jayasoma et al.

(10) Patent No.: US 9,112,393 B2
(45) Date of Patent: Aug. 18, 2015

(54) ELECTRIC DEVICE ROTOR AND METHODS FOR MANUFACTURE

(75) Inventors: Sujitha Jayasoma, Andover Hampshire (GB); Gaetan Adrien, Andover Hampshire (GB); Gunaratnam Sooriyakumar, Andover Hampshire (GB); Jean-Marc Brun, Saint Bonnet de Mure (FR)

(73) Assignees: Control Techniques Dynamics Limited, Andover Hampshire (GB); Moteurs Leroy Somer, Angouleme (FR)

( * ) Notice: Subject to any disclaimer, the term of this patent is extended or adjusted under 35 U.S.C. 154(b) by 740 days.

(21) Appl. No.: 13/257,544
(22) PCT Filed: Mar. 16, 2010
(86) PCT No.: PCT/IB2010/051135
§ 371 (c)(1),
(2), (4) Date: Feb. 15, 2012
(87) PCT Pub. No.: WO2010/106497
PCT Pub. Date: Sep. 23, 2010

(65) Prior Publication Data
US 2012/0133229 A1  May 31, 2012

(30) Foreign Application Priority Data
Mar. 20, 2009 (GB) .................................. 0904859.6

(51) Int. Cl.
*H02K 1/27* (2006.01)
*H02K 1/28* (2006.01)

(52) U.S. Cl.
CPC .................. *H02K 1/28* (2013.01); *H02K 1/278* (2013.01); *Y10T 29/49012* (2015.01)

(58) Field of Classification Search
CPC ....... H02K 1/27; H02K 1/2706; H02K 1/278; H02K 1/28; H02K 1/30
USPC ............. 310/156.09, 156.19, 156.36–156.38, 310/156.43, 156.45, 156.47–156.49, 310/156.53, 156.55–156.57, 216.008, 310/216.011, 216.013, 216.016, 216.096, 310/156.13, 216.123
See application file for complete search history.

(56) References Cited

U.S. PATENT DOCUMENTS 4,642,502 A * 2/1987 Carpenter et al. ........ 310/156.12
4,658,167 A * 4/1987 Popov et al. ............. 310/156.55
(Continued)

FOREIGN PATENT DOCUMENTS

DE  10 2004 036 691 A1  4/2005
DE  10 2005 048 731 A1  4/2007
(Continued)

OTHER PUBLICATIONS

International Search Report for International Application No. PCT/IB2010/051135 Dated Mar. 30, 2011.
(Continued)

*Primary Examiner* — Naishadh Desai
(74) *Attorney, Agent, or Firm* — Jones Robb, PLLC (57) ABSTRACT

A rotor (100) having a first plurality of laminates (110), comprising a first plurality of protrusions (120) located at a periphery of each of the first plurality of laminates, and a second plurality of laminates (1101), arranged differently from the first plurality of laminates (110) around a shaft hole (132), comprising a second plurality of protrusions (120') located at a periphery of each of the second plurality of laminates, wherein the first plurality of protrusions are asymmetric and/or angularly offset from the second plurality of protrusions, and wherein the second plurality of protrusions are asymmetric and/or angularly offset from the first plurality of protrusions. The rotor further having a plurality of magnets (115), each inserted between the first plurality of protrusions and/or the second plurality of protrusions, wherein reactive forces operate to hold the plurality of magnets.

13 Claims, 5 Drawing Sheets

(56) References Cited

U.S. PATENT DOCUMENTS

| | | | |
|---|---|---|---|
| 5,760,520 A | 6/1998 | Hasebe et al. | |
| 6,177,749 B1 * | 1/2001 | Hussey et al. | 310/216.121 |
| 6,426,576 B1 * | 7/2002 | Varenne | 310/156.09 |
| 6,732,986 B2 * | 5/2004 | Heidrich | 248/206.5 |
| 6,784,582 B1 * | 8/2004 | Kolomeitsev et al. | 310/156.38 |
| 7,057,322 B2 | 6/2006 | Araki et al. | |
| 7,154,204 B2 * | 12/2006 | Koenig | 310/156.19 |
| 7,737,592 B2 * | 6/2010 | Makino et al. | 310/156.09 |
| 7,868,503 B1 * | 1/2011 | Nakayama et al. | 310/156.56 |
| 7,900,339 B2 * | 3/2011 | Makino | 29/596 |
| 2005/0017587 A1 * | 1/2005 | Koenig | 310/156.19 |
| 2006/0131976 A1 * | 6/2006 | Kikuchi et al. | 310/156.46 |
| 2007/0222317 A1 | 9/2007 | Morel | |
| 2008/0157620 A1 | 7/2008 | Longo et al. | |

FOREIGN PATENT DOCUMENTS

| | | |
|---|---|---|
| EP | 0 392 028 A1 | 10/1990 |
| JP | 2008-109726 A | 5/2008 |
| JP | 2008-141799 A | 6/2008 |
| WO | WO 01/06624 A1 | 1/2001 |
| WO | WO 2005/027312 A1 | 3/2005 |
| WO | WO 2007/068515 A1 | 6/2007 |

OTHER PUBLICATIONS

International Written Opinion for International Application No. PCT/IB2010/051135 Dated Mar. 30, 2011.

Office Action from corresponding Chinese Application No. 2010800222897, dated Aug. 19, 2013.

* cited by examiner

ELECTRIC DEVICE ROTOR AND METHODS FOR MANUFACTURE

This is a national stage application of PCT/IB2010/051135, filed internationally on Mar. 16, 2010, which claims priority to United Kingdom Application No. 0904859.6, filed on Mar. 20, 2009.

TECHNICAL FIELD

The present invention relates to permanent magnet motors and/or generators. The invention relates more particularly to a rotor comprising permanent magnets retained by a plurality of laminates so as to produce alternating magnetic fields that interact with a stator.

BACKGROUND

Magnet retention on a rotor may take into consideration several factors. Magnets may be made of a relatively brittle material, such as various ceramics, and may be structurally weak and centrifugal forces during operation may be high, particularly with high speed rotors. Further, it is desirable to minimize the space between the rotor and the stator for purposes of maximizing the magnetic field, which weakens as the radial separation between the rotor and the stator increases, and limiting leakage of magnetic flux there between. Moreover, permanent magnet motors frequently operate in environments spanning a wide range of temperatures, and therefore, the rates of thermal expansion of the components of the rotor may differ substantially over the temperature range.

In some systems, magnets have been bonded to the surface of a rotor using an adhesive or other substance, and then held in place by an outer tape of high-strength material, such as glass or carbon fibre. In such systems, an encapsulant may be used to fill the spaces between the magnets. Such a method may result in the expenditure of substantial time to fabricate the rotor. Further, the thickness of the tape may increase the distance between the stator and rotor, resulting in increased magnetic flux leakage and reduced efficiencies of the motor. Moreover, expansion rates associated with the tape under tension and fluctuations in temperature may make it difficult to maintain an adhesive bond in compression at high rotational speeds. In the absence of such compression, the adhesive bond may peel, thereby allowing the magnets to move.

In other systems, magnets have been placed inside of the rotor, such that the rotor structure retains the magnets. For example, U.S. Patent Publication No. 2008/0157620 to Longo et al. ("Longo") discloses a process for mounting magnets in a rotor, the rotor comprising a plurality of axial channels and a plurality of inner radial projections. Within each of these axial channels is disposed a permanent magnet, which is retained via deformation of each of the plurality of inner radial projections which may form a stop to axially retain the magnets. Further, PCT Publication WO 01/06624 to Matsushita Electrical Industrial Co. Limited ("Matsushita") discloses a synchronous motor including a stator, a rotor, and permanent magnets. The permanent magnets of Matsushita are butted end to end to form V type configurations and embedded internally in magnet retaining holes of the rotor. However, the interior magnet constructions of the prior art may result in compromises in the magnetic circuit that may reduce performance and efficiency. Further, using these interior magnet designs may lead to complications in optimizing the distance between the stator and the rotor magnets, among other issues.

In yet other systems external systems for retaining magnets have been implemented. For example, U.S. Patent Publication No. 2007/0222317 to Morel ("Morel") discloses a synchronous motor including a rotor with a plurality of magnets with corresponding clamping elements arranged as a web between the magnets and the body of the rotor. Following insertion of each of the magnets associated with the rotor, a tool or punch must be utilized on each of the clamping elements to deflect the web of the elements such that they contact the magnet. Such systems may result in substantial added time during assembly and further proper assembly may depend on the skill of an operator actuating the tool. Further, such systems may suffer from "spring back" of the material used for forming the web. This spring back may result in poorly restrained magnets and possible early failure of the rotor.

In yet other systems, externally situated magnets have been retained via notches formed in the magnets and restraining elements lockingly engaged in these notches. Such a system is disclosed in U.S. Pat. No. 6,732,986 to Heidrich ("Heidrich"). Such systems may also result in added assembly time as a result of the desire to ensure locking engagement of the restraining elements with the magnet notches. Further, such configurations may limit the number of magnets to be implemented on a particular rotor, thereby resulting in potential efficiency reductions.

Japanese publications JP2008-109726 and JP2008-141799 describe rotors having a laminated core with a through hole and a plurality of substantially arc-like magnets disposed on the external circumference of the laminated core. German publication DE102005048731 describes recessed retaining overhangs extending in an axial direction with retaining sections, which are pre-stressed to sit close to permanent magnets.

Accordingly, there exists a need for a rotor that is relatively easy to assemble and reliable, has acceptable performance of the magnetic circuit and is capable of holding the magnets under a wide range of rotational speeds and temperatures, while further avoiding excessive stresses on the magnets.

SUMMARY OF THE DISCLOSURE

In one aspect, the present disclosure is directed to a rotor. The rotor includes a first plurality of laminates, comprising a first plurality of protrusions located at a periphery of each of the first plurality of laminates, a second plurality of laminates, arranged differently from the first plurality of laminates around a shaft hole, comprising a second plurality of protrusions located at a periphery of each of the second plurality of laminates, wherein the first plurality of protrusions are asymmetric and/or the first plurality of protrusions are angularly offset from the second plurality of protrusions, and wherein the second plurality of protrusions are asymmetric and/or the second plurality of protrusions are angularly offset from the first plurality of protrusions. The rotor further comprises a plurality of magnets, each inserted between the first plurality of protrusions and/or the second plurality of protrusions, wherein reactive forces operate to hold the plurality of magnets, the reactive forces being caused by
- deformations of the first plurality of protrusions and/or the second plurality of protrusions, the deformations enabled based on the asymmetry of the first and second plurality of protrusions, and/or
- angular offset of the first plurality of protrusions relative to the second plurality of protrusions.

Notably systems of the present invention enable simplified construction techniques, improved efficiencies, and improved magnet retention. The present disclosure enables magnet retention via asymmetric protrusions and/or angularly offset protrusions, and reactive forces associated therewith, thus resulting in the above noted advantages, among others.

In another aspect, the present disclosure is directed to a rotor, wherein a magnet cross section viewed along an axis of rotation of the rotor includes angled sides. Such angled sides may bear against the protrusions. The angled sides may also have rounded or other suitably shaped edges In yet another aspect, the present disclosure is directed to a rotor, wherein the magnets extend past the first and second protrusions as measured along the radial axis moving away from the laminate. This may aid in reducing the thickness of the gap between the rotor and a stator.

In yet another aspect, the present disclosure is directed to a rotor, wherein the reactive forces are caused by insertion of a keyed shaft in keyways of the first plurality of laminates and the second plurality of laminates, and wherein the first plurality of laminates are initially angularly offset from the second plurality of laminates. The first plurality of laminates may comprise key punches that are initially offset from keypunches of the second plurality of laminates.

In yet another aspect, the present disclosure is directed to a rotor, wherein the first plurality of laminates and the second plurality of laminates further each comprise a tool access hole receiving an insert, wherein the reactive forces are caused by a relative rotation of at least one of the first plurality of laminates and the second plurality of laminates because of the insert received in the tool access hole. Respective tool access holes may be offset prior to insertion of the tool.

In yet another aspect, the present disclosure is directed to a method for manufacturing a rotor. The method includes providing a first plurality of laminates comprising a first plurality of asymmetric protrusions located at a periphery of each of the first plurality of laminates, providing a second plurality of laminates, comprising a second plurality of asymmetric protrusions located at a periphery of each of the second plurality of magnets, the second plurality of laminates arranged differently from the first plurality of laminates around a shaft hole, and aligning the first plurality of laminates and the second plurality of laminates. The method further includes inserting each of a plurality of magnets between the first plurality of asymmetric protrusions and/or the second plurality of asymmetric protrusions, wherein the inserting results in deformations of the first and second plurality of asymmetric protrusions, the deformations causing reactive forces acting to hold the magnets.

In yet another aspect, the present disclosure is directed to a method for manufacturing a rotor, further comprising inserting more than one magnet in a substantially simultaneous operation.

In yet another aspect, the present disclosure is directed to another method for manufacturing a rotor. The method includes providing a first plurality of laminates each comprising a first keyway and/or a tool access hole, and a first plurality of protrusions located at a periphery of each of the first plurality of laminates, providing a second plurality of laminates, comprising a second keyway and/or a second tool access hole, and a second plurality of protrusions located at a periphery of the second plurality of laminates, wherein the first keyways are initially angularly offset from the second keyways, and/or the first tool access holes are initially angularly offset from the second tool access holes, and inserting each of a plurality of magnets between the first plurality of protrusions and/or second plurality of protrusions. The method further includes inserting a key into the first keyways and the second keyways and/or an insert into the first tool access holes and the second tool access holes, wherein the inserting causes a rotational deflection of at least one of the first plurality of laminates and the second plurality of laminates about a rotational axis, wherein the rotational deflection results in reactive forces being applied on the magnets by at least one of the first plurality of protrusions and the second plurality of protrusions to hold them on the laminates.

In yet another aspect, the present disclosure is directed to a method for manufacturing a rotor, wherein the inserting includes aligning a tapered end of the tool with the first and second tool access holes.

In yet another aspect, the present disclosure is directed to a method for manufacturing a rotor, further comprising installing a fastener in operable connection with the tool following insertion of the tool through tool access holes in both the first and second plurality of laminates.

In yet another aspect, the present disclosure is directed to a method for manufacturing a rotor, wherein the key is part of a keyed shaft.

In yet another aspect, the present disclosure is directed to a method for manufacturing a rotor, wherein the tool is part of a tie rod.

In yet another aspect, the present disclosure is directed to a method for manufacturing a rotor, wherein the insert is configured to receive a fastener.

In yet another aspect, the present disclosure is directed to a rotor for a rotating electric machine. The rotor may include a core of laminates stacked according to a longitudinal axis of the rotor and defining channels, permanent magnets engaged in the channels, each magnet coming into contact, in a housing corresponding, to opposite edges of laminates belonging respectively to two pluralities of laminates of the core, at least one insert introduced through the laminates and cooperating with the laminates to induce a force on the magnets between said edges, the laminates being configured so that the introduction of the insert results in a relative displacement of one plurality of laminates as compared to the second plurality of laminates and exerts the force.

Because of one or more of these aspects, it may be possible to maintain the permanent magnets in place within the channels of the rotor based on the forces (e.g., tightening) exerted by the laminates without utilization of additional joining, adhering, and/or hooping devices.

Embodiments consistent with the present disclosure may enable the manufacture of a particular rotor without the assistance of special tools for deforming parts of rotor or other pieces that may add complexity.

In yet another aspect, the present disclosure is directed to a rotor where each laminate comprises an opening to receive a shaft of the rotor and a tool access holes for inserting the insert.

In yet another aspect, the present disclosure is directed to a rotor where each laminate comprises several tool access holes each for inserting a respective insert, and distributed individually or grouped uniformly around the longitudinal axis of the rotor.

Such a configuration may enable improved distribution of forces resulting from angular displacement and/or deflection; relative between one plurality of laminates as compared to the other, and may also reduce stresses on each insert.

In yet another aspect, the present disclosure is directed to a rotor where the tool access hole is located in each laminate at a distance from the longitudinal axis of the rotor that is less than that separating the bottom of a channel from the longitudinal axis of the rotor.

In yet another aspect, the present disclosure is directed to a rotor where the inserts are formed by stems of compression of the core of laminates, and comprise threaded ends.

In yet another aspect, the present disclosure is directed to a rotor where the tool access holes are configured such that, prior to insertion of an insert, a radial through the center of a first tool access hole in a first plurality of laminates and a radial through the middle of a neighbouring channel define a first angle, and wherein a radial passing through the center of each second tool access holes in a second plurality of laminates and a radial passing through the middle of a neighbouring channel define a second angle different from the first angle.

A neighboring channel as meant above is for example a channel that is radially facing the tool access hole or that is the closest channel to the tool access hole, angularly speaking.

The tool access holes of the first and second plurality of laminates may be angularly offset relative to a same direction before the introduction of the inserts in said tool access holes.

The introduction of said inserts causes the tool access holes of said first and second plurality of laminates to align and generates a tightening torque on the magnets in the channels between edges associated with the first and second pluralities of laminates In yet another aspect, the present disclosure is directed to a rotor, wherein the magnets are arranged such that a top surface of the magnet and the associated channel extend toward a stator associated with the electric machine.

In yet another aspect, the present disclosure is directed to a rotor where each channel comprises a bottom having a convex form. In other words, a base portion of the channels formed by a peripheral edge of each laminate, may comprise an arc between bases of adjacent protrusions which may have a convex form (i.e., a different radius of curvature) relative to a periphery circumscribed about points of an average or maximum radius (excluding protrusions) of each laminate.

In yet another aspect, the present disclosure is directed to a rotor where each laminate comprises channels whose lateral edges are defined by protrusions having lateral sides, and are associated with the laminates.

In yet another aspect, the present disclosure is directed to a rotor where each protrusion comprises a base extending radially and comprising said lateral sides, and two extensions directed in opposite directions and partially in contact with the permanent magnets.

Each channel may include a convex surface associated with the laminate. At least two consecutive protrusions of a laminate may be configured so that the width of a channel, defined by distance between the two lateral edges of the channel, is slightly wider than the width of a permanent magnet to be engaged in the channel, this magnet width being measured between the opposing sides of the permanent magnet. Thus, the magnets may be placed in the channels before introduction of the inserts into the tool access holes such that clearances exists between the edges of the magnets and the lateral sides of the protrusions. These clearances are for example equal to or higher than about 0.2 mm.

The difference between the first and second angles may be configured such that, when the inserts are introduced into the tool access holes, the clearances may be eliminated by angular offset or deflection of the first and second plurality of laminates relative to each other. In some embodiments, elimination of the clearances may be partially or completely compensated for by elasticity associated with the laminates and/or the inserts. In yet another aspect, the present disclosure is directed to a rotor, the rotor having a core comprising a plurality of laminates, the plurality of laminates arranged alternatingly between a first laminate and a second laminate, which is different from the first laminate.

By including alternating laminates from a first plurality of laminates and a second plurality of laminates, homogenization of forces tightening each magnet may be obtained with regard to the respective protrusions associated with the laminates. The first and second pluralities of laminates can be grouped into groups of two, three, or more, and the groups of laminates belonging respectively to the two pluralities can alternate along the longitudinal axis of the rotor.

In yet another aspect, the present disclosure is directed to a method for manufacturing a rotor associated with a rotating electric machine. The rotor may comprise a core of laminates stacked along a longitudinal axis of the rotor and may define channels, the core of laminates further including a first plurality of laminates and a second plurality of laminates, the first plurality of laminates comprising first tool access holes offset from second tool access holes associated with the second plurality of laminates. The method may include;

engaging the magnets in the channels, and introducing at least one insert through the tool access holes, the introduction of the insert being accompanied by a relative rotation of the first plurality of laminates compared to the second plurality of laminates, the relative rotation tending to align the tool access holes and generate a tightening torque on the magnets in the channels between edges associated with the first and second pluralities of laminates.

In yet another aspect, the present disclosure is directed to a method in which the inserts are formed by stems of compression of the core of laminates that comprise threaded portions.

The presence of such threads may enable one or more fasteners (e.g., bolts) to be threaded through the tool access holes, and the laminates to be compressed along the longitudinal axis based on a tightening of the fasteners.

Rotors consistent with the present disclosure may be utilized, for example, in a revolving electric machine with an external rotor or in an alternative, to be used in an electric internal rotor machine. The machine may be an engine or a generator, being for example a polyphase machine, in particular three-phase.

The inserts may extend along the longitudinal axis of the rotor and each insert for example may be introduced parallel to the longitudinal axis of the rotor.

Once the insert has been used to align the tool access holes, the insert may remain interdependent of the core of laminates, or be replaced by another insert, the insertion of this new insert possibly being substantially simultaneous with the beginning of removal of the preceding insert.

DESCRIPTION

Figures 1, 2A, 2B:
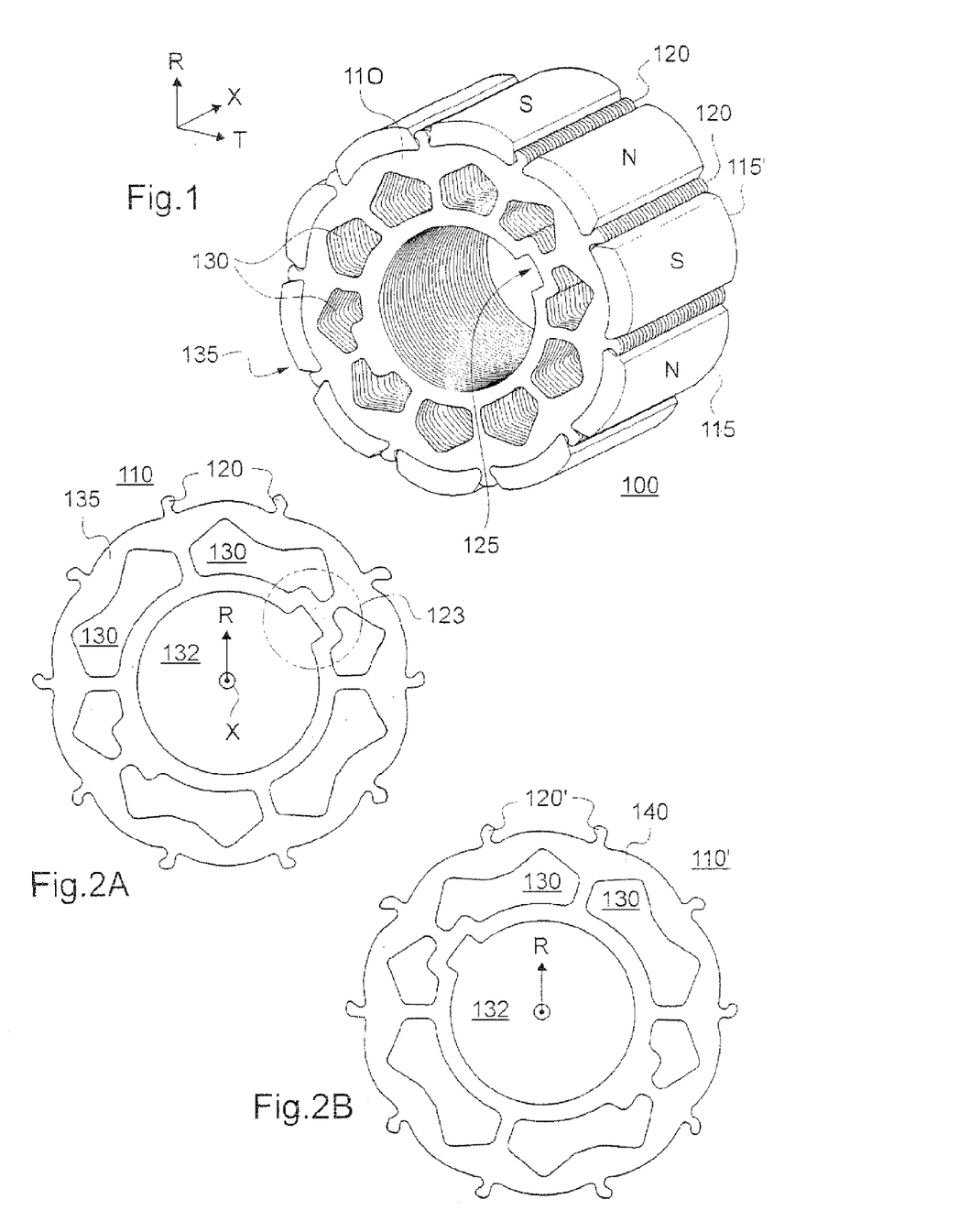
FIG. 1 is an illustration of an exemplary electric device rotor consistent with embodiments of the present disclosure.
FIG. 2A is an illustration of an exemplary first laminate consistent with embodiments of the present disclosure.
FIG. 2B is an exemplary second laminate which may be a mirror-image of the exemplary laminate shown in FIG. 2A.

FIG. 1 is an illustration of an exemplary electric device rotor 100 consistent with embodiments of the present disclosure. Throughout the present disclosure, a system of axes will be used to describe various embodiments. These axes are shown in FIG. 1 as radial axis R, axial axis X, and tangential axis T.

Rotor 100 may be configured to be utilized in, for example, an electric motor, generator, or other device and comprises a stator (not shown), a shaft (not shown), a casing (not shown), and other components for purposes of performing various operations (e.g., performing work, generating electrical current, etc.) In some embodiments, such electric devices may be configured to operate at powers between about 0 and 100 kilowatts (kW), and in some embodiments higher power as desired. Such electric devices may further comprise polyphase devices, for example, a three-phase device. Therefore, rotor 100 may include one or more laminates 110, magnets 115, and keyway 125, among other things. Each laminate 110 may include protrusions 120, holes 130, a first face 135, a second face 140 (not shown in FIG. 1), a shaft hole 132, channels 16, and a keyway punch 123 (shown in conjunction with keyway 125 in FIG. 1). In addition, each laminate 110 may include a plurality of tool access holes 165 and 165' (not shown in FIG. 1).

FIG. 2A is an illustration of an exemplary first laminate 110 showing a first face 135 of exemplary laminate 110, while FIG. 2B is an exemplary second laminate 110', which, in some embodiments, may be a mirror image of the exemplary laminate 110 of FIG. 2A, and having a second face 140. Laminates 110 and 110' may be fabricated from any suitable material (e.g., magnetic materials such as steel, iron, etc.) and may be stamped, machined, and/or otherwise cut to any desired size and shape. Sizing, design, and fabrication of laminates 110 and 110' may take into consideration various factors such as strength, weight, magnetic flux, eddy current generation, cooling, and motor size, among other things. In some embodiments, a shape associated with laminates 110 and 110' may be substantially circular, having a radius 1, and/or may include variations in a circular form for incorporating protrusions 120, keyways, and external features, among others. According to some embodiments, radius 1 may represent an average or maximum radius of laminates 110 and 110', with a radius of curvature for a base of each channel 16 being different than radius 1 (e.g., resulting in a base of convex form). In some embodiments, laminates 110 and 110' may include "loose" laminations punched from a tool or modular laminations configured to stick together based on various manufacturing techniques (e.g., single-piece, mandrel-wound, etc.)

Laminates 110 and 110' may include a first face 135 and a second face 140 (as shown in FIG. 2B). First face 135 and second face 140 may be mirror images of each other, in other words, one face may be the opposite of the other. As noted, in some embodiments, multiple laminate sets may be fabricated to account for asymmetry in, for example, holes 130, among others, resulting in at least a first plurality of laminates 110 and a second plurality of laminates 110'. In some embodiments, second plurality of laminates 110' may be arranged differently from first plurality of laminates 110, as will be described in greater detail below. For example, when alternatingly assembled, first plurality of laminates 110 and second plurality of laminates 110' may not be substantially superimposed.

In some embodiments, laminates 110 and 110' may be aligned and alternatingly assembled and affixed together to form a core 101 of rotor 100. Notably, the alternating may occur in groups of one or more laminates 110 and 110'. For example, laminates 110 and 110' may be alternated, every other laminate, grouped and alternated every two, three, four, or more laminates, and/or any combination there of Assembly of laminates 110 and 110' to form core 101 will be discussed in greater detail with regard to FIGS. 4-6.

Figure 2C:
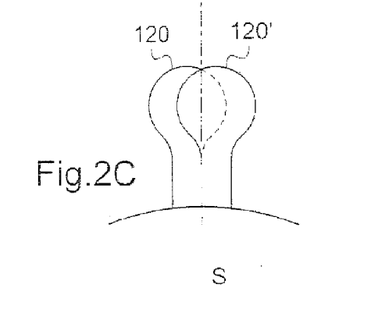
FIG. 2C is an illustration of a protrusion consistent with embodiments of the present disclosure.
Figure 2D:
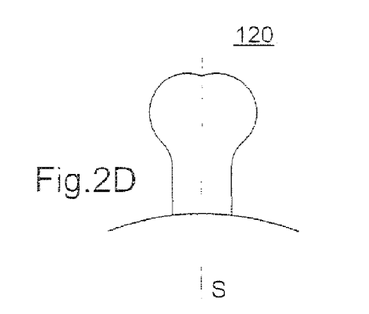
FIG. 2D is an illustration of an alternative protrusion consistent with embodiments of the present disclosure.

Protrusions 120 and 120' extend from a peripheral surface of laminates 110 and 110' substantially along radial axis R. Protrusions 120 may be shaped such that a width w of protrusion 120, as measured along tangential axis T, at the periphery of laminate 110, may be less than a width w' of protrusion 120, as measured along tangential axis T, at a further point on radial axis R (e.g., the top of protrusion 120). In other words, protrusions 120 may appear asymmetric alone, but as shown in FIG. 2C, with an apparent symmetry about axis S when viewed in conjunction with another superposed laminate 110' including protrusions 120'. In some embodiments consistent with the present disclosure, the shape may resemble a somewhat angled "P-shaped" or somewhat reverse angled "P-shaped" protrusion. One of ordinary skill in the art will recognize that it is not intended that the terms "P-shaped" or somewhat reverse "P-shaped" be limited to an exact P-shape, and that use of such a description is subjective and intended as exemplary only. For example, one of ordinary skill in the art may also consider the shape to resemble a lower case "i" or other similar shape. Alternatively, as shown in FIG. 2D, protrusions 120 may be symmetric about axis S, for example, as a "T," a heart, or other shaped structure. In some embodiments, the resulting shape may include a groove or other similar feature near or at the top of protrusions 120.

In some embodiments, a plurality of protrusions may be spaced around the periphery of laminates with consideration for, e.g., balance, magnet count, and load considerations, and may be fabricated from the same material as laminates 110 and 110'. Alternatively protrusions 120 and/or 120' may be dissimilar to laminates 110 and 110' (e.g., altered via lasing, etc.) The number of protrusions about a laminate may depend in such factors as the size of rotor 100 and a desired number and size of magnets 115, among others. For example, where it is desired to place six magnets 115 around the periphery of laminate rotor 100, there may be twelve protrusions 120 around the periphery of laminate 110. Alternatively, in such an example, there may be six protrusions 120 around the periphery of a first laminate 110 and six protrusions 120' spaced around the periphery of a second laminate 110'. Further, orientations of protrusions 120 and 120' may be alternated around the periphery of laminates such that each protrusion is oriented opposite of the preceding protrusion, as shown in FIG. 2. In other words, where the shape of the protrusions is "P-shaped," each "P-shape" may be followed by a reversed "P-shape" on the periphery of the laminate as shown in FIGS. 2A and 2B.

Shaft hole 132 is configured to receive a shaft (not shown) or other item aligned substantially along axial axis X, particularly after assembly of a first plurality of laminates 110 and/or a second plurality of laminates 110'. The shaft is configured to be inserted into shaft hole 132 and may include a key or other similar device as desired. Shaft hole 132 is sized and shaped to operatively connect with the shaft (not shown), for example of an inner radius r substantially similar to an outer diameter of the shaft (not shown). In some embodiments, this shaft (not shown) may function as an output, and/or an input shaft of an electric device associated with rotor 100. Further, in some embodiments, such a shaft may be substantially cylindrical in shape, and may include various features for accomplishing tasks associated with an electric device. For example, shaft (not shown) may include various splines, keys, threads, or other suitable features for mating and/or joining with components of an electrical motor system. Such mating and joining may include operable connectivity, machine interaction, and/or any other type of interaction based on a desired design. For example, other embodiments may include various shapes and features associated with shaft (not shown) and shaft hole 132 for purposes of affecting a predetermined design. All such variations are intended to be included within the scope of the present invention.

Keyway 125 may be formed by keypunch 123 and/or keypunch 123', upon assembly of a first plurality of laminates 110 and/or a second plurality of laminates 110'. Keypunches 123 and 123' and therefore, keyway 125, may be configured to allow passage and/or operable connection of a key or other feature of a shaft (not shown), upon insertion of shaft through shaft hole 132. For example, where an shaft includes a key feature, such a key may be configured to mate with keyway 125 formed by keypunch 123 in each of laminates 110 and keypunch 123' in laminates 110'. Notably, laminates 110 and 110' may include one or more keypunches 123 and 123' resulting in one or more keyways 125 formed in an assembled rotor. Such a configuration may allow for placement on a splined or similar shaft.

In some embodiments, keypunches 123 and 123' in each of laminates 110 and 110' may be angularly offset and/or otherwise configured to accomplish various tasks upon assembly. For example, keypunches 123 and 123' may be configured such that, once a plurality of laminates 110 and 110' are assembled and upon insertion of one or more magnets between protrusions 120 and 120', a force is exerted through keyway 125 upon the key of the shaft (not shown). Alternatively, insertion of a key through keyway 125 results in rotational deflection of laminates 110 and 110'. For example, a key associated with shaft (not shown) may include a tapered and configured to pass between offset keypunches 123. As the tapered portion of the key passes through the angular offsets of each keyway punch 123, a corresponding rotation of the associated laminate occurs, resulting in forces applied through protrusions 120 and/or 120' to magnets 115. Additional discussion of such features will be discussed below in greater detail with regard to FIGS. 4-6.

Holes 130 may include various shapes and configurations of holes punched or otherwise formed through the laminate. For example, design considerations may specify a particular weight for laminates 110 and 110', strength based on, e.g., load, balance, location of protrusions 120, and particular cooling factors therewith. In such a design, holes 130 may be fabricated and aligned according to the design so as to substantially meet the desired guidelines. In some embodiments, such feature punches may result in a hub-and-spoke type configuration for laminates 110 and 110'.

Holes 130 may also be configured for balance and or support for, for example, protrusions, keypunches, and/or other desired elements. Further, all holes 130 may be of a single size and shape, or may alternatively be configured as differing shapes and sizes. For example, a single hole 130 may be provided in a desired location on laminates 110 and 110'. In other embodiments, holes 130 may be provided near or adjacent to each of magnets 115. Notably, holes 130 may be of any size and shape desired to satisfy various design and/or other parameters. One of ordinary skill in the art will recognize that numerous other design factors may relate to the location, size, shape, etc., of holes 130. All such factors and resulting holes 130 are intended to fall within the scope of the present disclosure.

Figures 8, 9, 10:
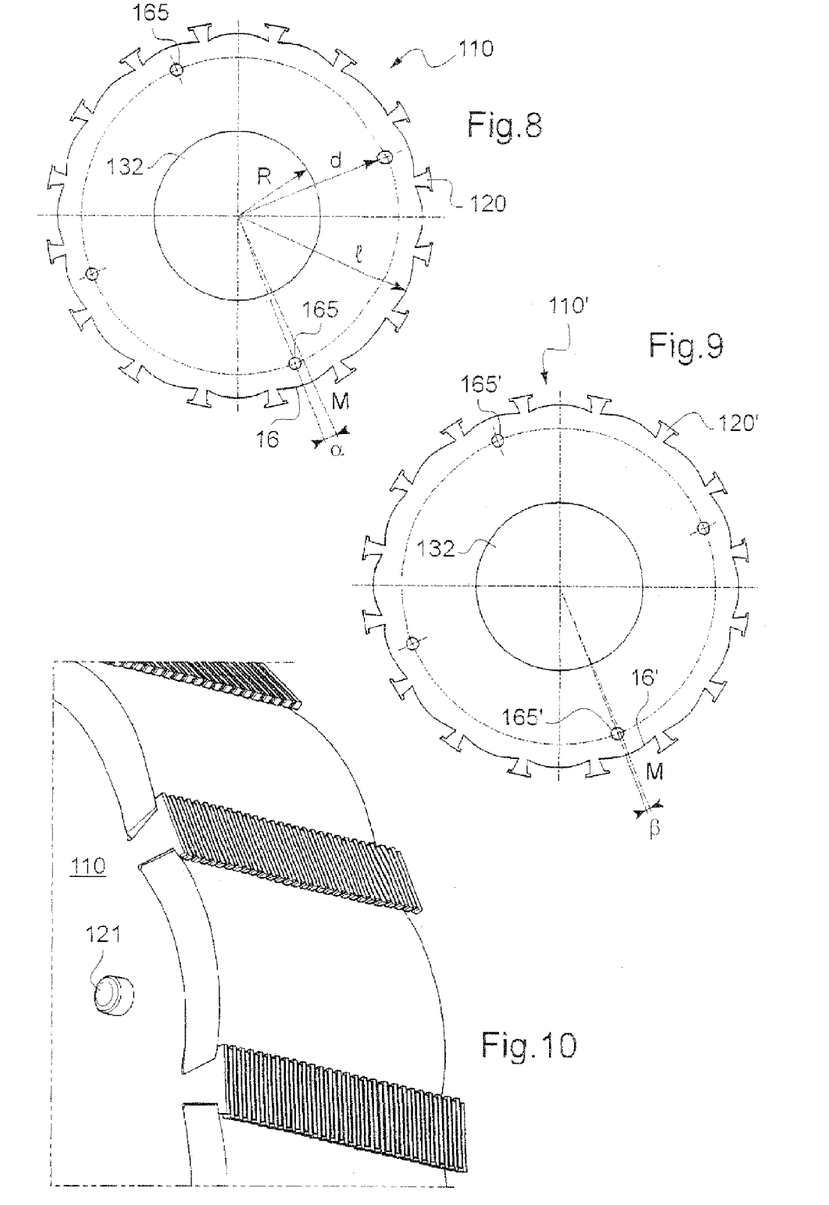
FIG. 8 shows an exemplary laminate associated with embodiments of the rotor shown in FIG. 7.
FIG. 9 shows another exemplary laminate, different from that of FIG. 8, and associated with embodiments of the rotor shown in FIG. 7.
FIG. 10 shows the rotor of FIG. 7 following insertion of an exemplary insert.

Tool access holes 165 and 165' (shown in FIG. 6) may be provided in each of laminates 110 and 110', and may present, for example, a circular cross-section. Tool access holes 165 and 165' also may present other cross-sections, such as, for example, polygonal and/or ovoid. Any such cross-sections are intended to fall within the scope of the present disclosure. For example, a first plurality of laminates 110 may include a first plurality of tool access holes 165 of circular cross-section, which may be evenly distributed around the axial axis X at a particular radius (D) of the laminates. The radius D may be greater than the radius r, but less than the distance 1 as measured from axial axis X. A second plurality of laminates 110' may include a second plurality of tool access holes 165' of circular cross-section and angularly offset from the first plurality of tool access holes 165, again located at a particular radius (D) of the laminates. For example, a first laminate 110 may include three tool access holes 165 spaced at 120 degrees around the first laminate 110. A second plurality of laminates 110' may include three tool access holes 165' also spaced at 120 degrees around the second plurality of laminates 110'. Upon assembly of the first plurality of laminates 110 and the second plurality of laminates 110', an apparent angular offset of tool access holes 165 and tool access holes 165' may occur. In other words, as shown in FIGS. 8 and 9, an angle $\alpha$ may be measured on a first plurality of laminates 110 between a line passing through the center of tool access hole 165 and the longitudinal axis, and a line passing through a point M midway along a channel 16 formed by and between protrusions 120. A second angle $\beta$ may be measured on the second plurality of laminates 110' between a radial passing through the center of tool access hole 165', and a radial through a point M midway along a channel 16' formed by protrusions 120'. In some embodiments, a difference will exist between angles $\alpha$ and $\beta$, and a relationship between angle $\alpha$ and angle $\beta$ may be represented as, for example, $0.8 \le |\alpha - \beta| \le 1.2$.

An insert 121 (shown inserted in FIG. 10) configured for insertion through tool access holes 165 may comprise a rod, stud, spring pin, rivet, and/or other similar item, having an outer diameter (OD) and/or cross-section substantially similar to an inner diameter (ID) and/or cross-section of tool access holes 165 and 165'. For example, where a circular cross-section is implemented for tool access holes 165 and 165', a similar cross-section may be presented by insert 121. In some embodiments, such inserts 121 may include a tapered end for facilitating insertion through tool access holes 165 and 165' and may be lubricated with desired compounds based on design consideration.

In some embodiments, insertion of such an insert 121 through tool access holes 165 and 165' results in rotational deflection of the first and second pluralities of laminates 110 and 110'. This will be described in greater detail with regard to FIGS. 4 and 6-10. In some embodiments, following insertion, insert 121 or inserts may remain within the core and used to secure the laminates (e.g., via a threaded or other suitable fastening type implementation.) Alternatively, in some embodiments, the laminates may be glued or otherwise affixed following insertion of insert 121 or inserts, and once in a desired condition, insert 121 or inserts may be removed. Such embodiments may be helpful where rotor inertia presents particular design considerations.

Figure 3:
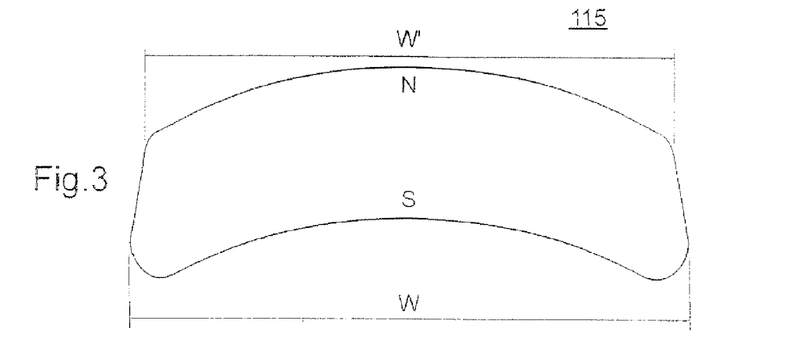
FIG. 3 is a cross-section view of an exemplary magnet consistent with embodiments of the present disclosure.

FIG. 3 is a cross-section view of an exemplary magnet 115 consistent with embodiments of the present disclosure. As shown in FIG. 3, magnet 115 comprises any material or object producing a magnet field, and may be configured and contoured to match shapes associated with laminates 110 and/or 110'. Further, a cross-section of magnet 115 along radial axis R and tangential axis T may possess angled sides, such that a first width 153 along tangential axis T at a base of magnet 115 is greater than a second width 155 along tangential axis T at a top of magnet 115. Further, as shown in FIG. 3, the tops and bottoms of magnets 115 may be curved to accommodate various geometries for rotor 100. Particularly, geometries of magnets 115 may be designed based on numerous factors such as, for example, cogging, torque ripple, and other desired considerations. In some embodiments, magnets 115 may present a flat bottom based on particular design considerations. One of ordinary skill in the art will recognize that various other sizes, shapes, and configurations for magnets 115 may be implemented without departing from the scope of the present disclosure. Further, the present disclosure is not intended to be limiting with regard to the number of magnets 115 implemented with rotor 100. For example, the rotor may include four, six, eight, ten, twelve, fourteen, sixteen, or more magnets 115. Therefore, the description herein is intended as exemplary only.

Magnets 115 may be further configured such that a distance, measured along radial axis R (i.e., height), results in magnets 115 extending past protrusions 120 and/or 120' along radial axis R moving away from rotor 100 upon insertion of magnets 115 therebetween. In other words, a height of magnets 115 may be such that, once inserted into an assembled rotor core 101, the top of magnet 115 protrudes beyond protrusions associated with the laminates. This may result in improved torque ripple and improved torque efficiency, among other things.

Magnetic fields of magnets 115 are aligned such that alternating fields are present about rotor 100. For example, a first magnet 115 may be aligned such that N is on top of the magnet and S is on the bottom. A second magnet 115', located adjacent to the first magnet 115 may be aligned with S on top and N on the bottom. One of ordinary skill in the art will recognize that other such configurations are possible without departing from the scope of the present disclosure.

A stator (not shown) associated with rotor 100 may be of any suitable type, and may include a plurality of windings. For example a stator may be of concentrated winding, distributed winding, etc. Stator (not shown) may be configured for external or internal operation in conjunction with rotor 100, or may be configured for axial type operation (e.g., a rotor moving axially.) Teeth associated with stator (not shown) may further be configured to include shoes or may not include shoes depending on, for example, winding technique and other factors.

It is important to note that laminates 110 and 110', protrusions 120 and 120', and magnets 115 and 115' also may be configured for use as an external rotor. In other words, a stator may be located within rotor 100 and rotor 100 may rotate around the stator. Further, rotor 100 may include more or fewer elements than described. For example, a band or strap of material (e.g., glass fiber tape, etc.) may be wrapped around the magnets to satisfy particular design concerns (e.g., safety). While systems and methods of the present disclosure do not specifically implement such an element, such a configuration is not intended to be excluded.

Figure 4:
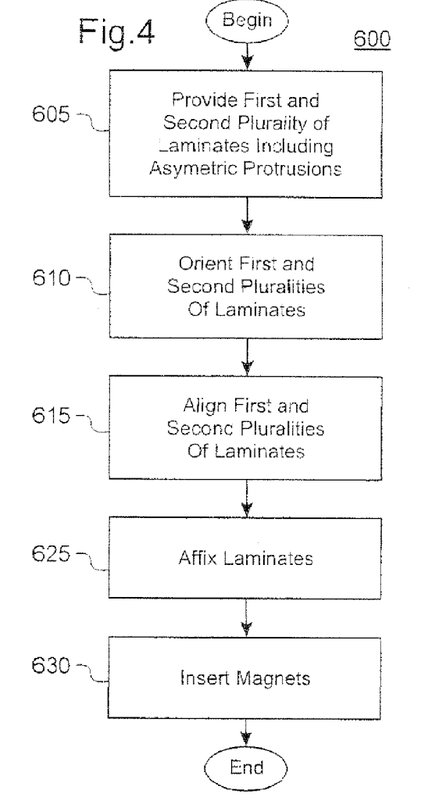
FIG. 4 is a flowchart illustrating an exemplary method for manufacturing exemplary rotors consistent with the present disclosure.

Systems and methods of the present disclosure may enable the manufacture of an electric device rotor 100 configured to allow increases in efficiencies and reductions in assembly times, among other things FIG. 4 is a flowchart 600 illustrating an exemplary method for manufacturing exemplary electric device rotors 100 consistent with the present disclosure. In such a method, one or more laminates may be prepared and provided, for example via a stamping, machining, or any other suitable process (step 605). For example, laminates 110 and 110' may be stamped as a predetermined size, shape, and configuration with protrusions 120 and 120' fabricated to a desired shape (e.g., symmetric or asymmetric) and holes 130 configured to meet desired design elements. The one or more laminates 110 and 110' may also be machined and/or cleaned as desired.

Fabricating (e.g., punching, machining, etc.) may involve attention to the location and shaping of holes 130, keypunches, and tool access holes (if any), among other things. Because laminates 110 and 110' may be intended to be alternatingly assembled, where a keypunch 123 and/or a hole 130 are intended to be asymmetric (e.g., for balance, load handling, cooling, protrusion support, etc.), a first set of laminates 110 may be fabricated with a first configuration, followed by second set of laminates 110' stamped with different (e.g., mirror images) asymmetric holes 130, keypunches 123, and/or tool access holes 165. Notably, alternation may take place in groups of one or more laminates 110 and 110'. It is important to note that in any and all embodiments, the fabrication of protrusions 120 and/or 120' may remain the same or may differ between both sets of laminates 110 and 110'.

Following the provision of the one or more laminates, or in some embodiments, the first set of laminates 110 and the second set of laminates 110', the laminates may be oriented according to the present disclosure (step 610). Orientation may include matching faces of each laminate 110 to that of another laminate 110'. For example, first face 135 of a first laminate 110 may be oriented to contact first face 135' of a second laminate 110'. Next, a second face 140 of a third laminate (not shown) may be oriented to contact second face 140 of either first laminate 110 or second laminate 110'. One of ordinary skill in the art will recognize that such orientation may continue until the remaining laminates 110 and/or 110' are oriented and assembled in a first face 135 to first face 135' and second face 140 to second face 140' orientation, thereby resulting in a mirror image type orientation.

In other embodiments, no such orientation may take place, and laminates 110 and/or 110' may be assembled accordingly. For example, in an alternating configuration, a laminate from a first plurality of laminates 110 may be placed adjacent to a laminate from a second plurality of laminates 110'. Further, another laminate 110 from the first plurality of laminates may then be placed adjacent to the other side of the laminate 110' from the second plurality of laminates, and so on. Such alternation may also be implemented in groups of one or more laminates (e.g., two, three, four . . . n laminates grouped up to the length of a magnet 115.)

Figure 5A:
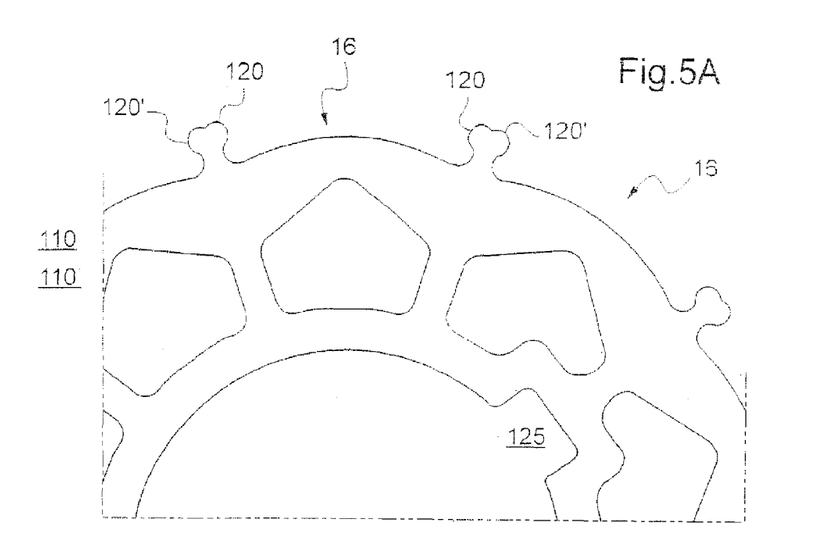
FIG. 5A is an illustration of an assembly of exemplary first laminate and second laminate consistent with embodiments of the present disclosure.
Figure 5B:
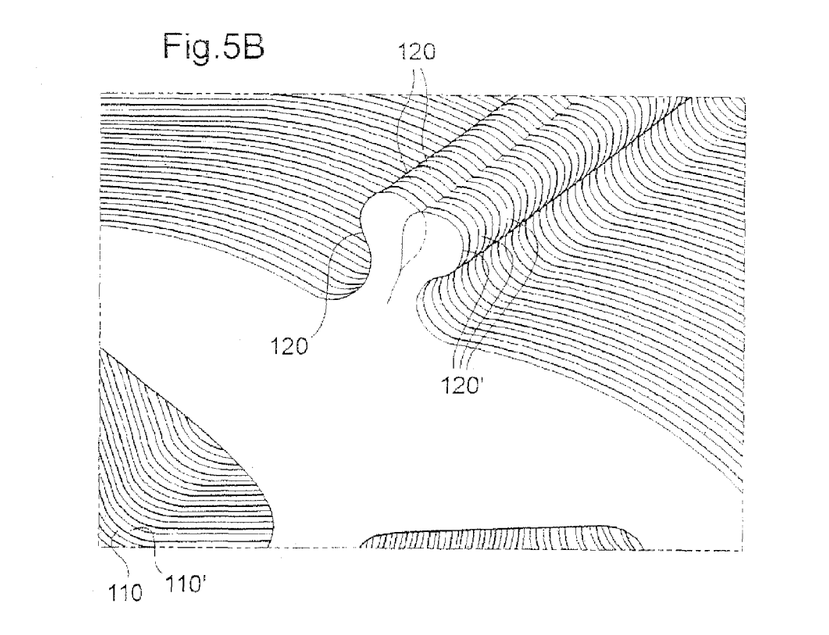
FIG. 5B is a magnified perspective view of a section of the sectional illustration shown in FIG. 5A.
Figure 6:
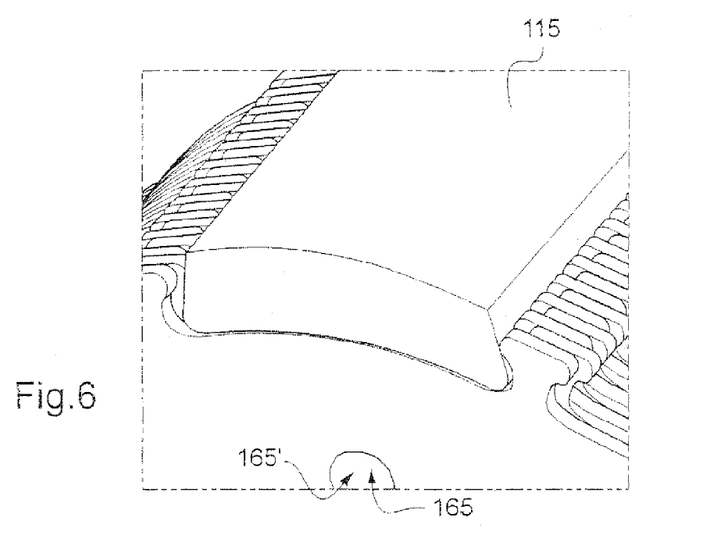
FIG. 6 is a magnified view of an alternate assembly of asymmetric protrusion configuration and inserted magnet.
Figure 7:
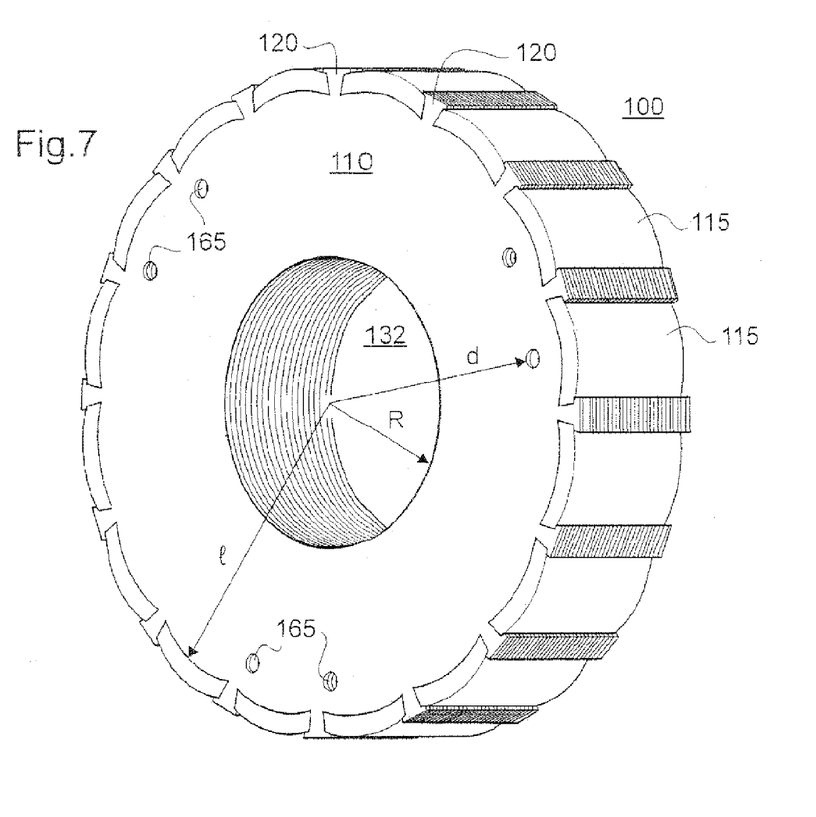
FIG. 7 is a diagrammatic and sectional view of another exemplary rotor according to some embodiments of the present disclosure.

Following and/or during the orientation, the laminates may be aligned as desired (step 615). For example, where asymmetric protrusions 120 and 120' have been fabricated, alignment of laminates 110 and/or laminates 110' may include rotating each laminate such that an apparent symmetry results between the first plurality of protrusions 120 and the second plurality of protrusions 120' when rotor 100 is viewed perpendicular to radial axis R. Such an apparent symmetry can be seen in FIG. 5A following assembly of a first laminate 110 and a second laminate 110'. As shown, when viewed perpendicularly to radial axis R, the first plurality of protrusions 120 of the first laminate 110 appear to be symmetric with respect to the second plurality of protrusions 120' of the second laminate 110'. This effect is further highlighted in FIG. 5B, which shows a plurality of laminates 110 oriented and aligned to form rotor core 101. As shown in FIG. 5B, each laminate 110 may be oriented and aligned such that an apparent symmetry along axis S (shown in FIG. 2C) results with regard to a preceding an/or succeeding laminate. Returning to FIG. 5A, it is apparent that a plurality of channels 16 for insertion of magnets 115 may be created between the first and second plurality of asymmetric protrusions along the periphery of rotor 100. Such channels may, based on a diameter of the laminates comprise a convex form, as desired. Alternatively, other forms may be used, for example, the surface may be flat.

Holes 130 of each laminate may substantially align to form features of rotor 100 and keypunches 123 substantially align to form keyway 125.

In some embodiments, particularly where symmetric protrusions 120 are implemented, alignment may be performed by taking into consideration angular offsets of keypunches 123 and 123' and/or tool access holes 165 and 165'. For example, in such an embodiment a first plurality of laminates 110 and a second plurality of laminates 110' may be assembled such that substantial alignment of protrusions 120 occurs. However, keypunches 123 associated with the first plurality of laminates 110 and keypunches 123' associated with second plurality of laminates 110' may be angularly offset. Therefore, upon alignment of protrusions 120, an operator may check the offset of keyway 125 and/or tool access holes 165 for a desired offset.

In some embodiments, a "stack" or "lamination" of laminates may be formed through the orientation, alignment, and assembly of multiple laminates. Such a "stack" or "lamination" forms core 101 of rotor 100, which may include one or more channels 16 for insertion of magnets 115. In such embodiments, laminates 110 and/or 110' associated with core 101 may be affixed to one another on a one-by-one basis, as a whole upon completion of the orientation and alignment steps for all laminates 110 and/or 110', or after magnets 115 have been placed (step 625). In some embodiments, where an insert is intended to be pressed into tool access holes 165 and 165', such an insert may include threads or other suitable means for affixing a fastener. For example, threads on insert 121 may allow a nut to be threaded on and tightened, thereby affecting a substantial attachment of the first and second pluralities of laminates 110 and 110' in core 101. One of ordinary skill in the art will recognize that other means of fastening may also be utilized without departing from the scope of the present invention (e.g., compression fit). Further, it may or may not be desirable to use any fastening method, and the laminates may have the ability, based on, for example, reactive forces on magnets 115, to remain in place.

Following affixing of laminates to one another, magnets 115 may be inserted between one of the first plurality of protrusions 120 and one of the second plurality of protrusions 120' (e.g., within channels 16) (step 630). For example, channels formed between two adjacent protrusions 120 of each laminate 110 of a first plurality of laminates, and/or channels formed between two adjacent protrusions 120' of each laminate 110' of a second plurality of laminates. In some embodiments, such an operation may be performed one magnet at a time, or, alternatively, all magnets may be inserted in a substantially simultaneous operation (e.g., via a machine press). This insertion results in a deflection and/or deformation of protrusions 120 associated with the particular channel 16 into which magnet 115 is being inserted. For example, the deflection and/or deformation may result because of a negative clearance between the magnets and the edges of the protrusions. This deflection and/or deformation results in associated reactive forces, which act to retain magnet 115 within channel 16. For example, where asymmetric protrusions are implemented, a deformation of the first and second pluralities of protrusions 120 and 120' is enabled because the protrusions are asymmetric. In other words, there is a clearance adjacent to each of the asymmetric protrusions, allowing a deformation without affecting surrounding structures (e.g., magnets 115, other protrusions 120, etc.)

Alternatively, magnets 115 may be inserted into channels 16 prior to affixing step 625. This may be desirable where, for example, a keyway punch 123 orientation has been used for purposes of exerting a force on a shaft (not shown) through keyway 125. In such embodiments a insertion of a key (not shown) associated with shaft (not shown) causes a rotational deflection of laminates 110, keypunches 123, and keyway 125, among others, resulting in reactive forces about axial axis X. Such forces act to restrain magnets 115 (e.g., via protrusions), and further to affix keyway(s) 125 to an inserted shaft. For example, a key (not shown) associated with a shaft (not shown) may include a tapered or otherwise suitable portion for initiating movement through offset keypunches 123 and 123'. In such an example, a force exerted on shaft (not shown) results in key (not shown) forcing a deflection of laminates 110 via action on the offsets of keypunches 123 and 123'. This deflection results in reactive forces exerted on magnets 115 via protrusions 120. Similarly, reactive forces acting through keyway 125 on shaft (not shown) and key (not shown) further assist in retaining the shaft and key within shaft hole 132. One of ordinary skill in the art will recognize that in such an embodiment, protrusions 120 on the first plurality of laminates 110 may also be offset from protrusions 120' on second plurality of laminates 110' or may be in alignment based on an offset associated with keypunches 123 and 123'. In addition, protrusions 120 and 120' may be symmetric, asymmetric, and/or any suitable shape. One of ordinary skill in the art will recognize that this is yet another exemplary depiction and is not intended to be limiting.

Notably, magnets 115 may be inserted into channels 16 one by one, or alternatively, all magnets 115 associated with rotor 100 may be inserted in one substantially simultaneous operation (e.g., using a machine press or other suitable tool).

Similarly, in other embodiments, additional offset keyways (e.g., for a splined shaft) or tool access holes 165 may be provided. Tool access holes 165 and 165' may be configured to receive an insert (e.g., a compression rod, threaded rod, etc.) as shown inserted in FIG. 10, and upon such insert being inserted, affect a rotational deflection about the axial axis of laminates 110. In such an embodiment, forces resulting from the rotational deflection may cause protrusions to act on each magnet 115, thereby facilitating restraint of magnets 115.

FIGS. 6-10 highlight an embodiment utilizing exemplary tool access holes 165 and 165' configured to receive an insert 121 for causing rotational deflection of one or more laminates 110 and/or 110'. In such an embodiment, steps above may be followed for assembly of rotor 100. Following insertion of magnets 115 into channels 16 (step 625), magnets 115 may have a lateral clearance relative to protrusions 120 and 120' within channels 16. One or more inserts 121 may then be inserted within tool access holes 165 and 165'. For example, an insert 121 may be configured to include a tool type end, (e.g., a tapered end or otherwise suitable end) for purposes of passing through angularly offset tool access holes 165 associated with a first and second plurality of laminates 110 and 110'. In such an embodiment, a tapered end of the inserts 121 may be aligned with tool access holes 165 and 165' and forced through all of laminates 110 and 110' associated therewith. Upon insertion of such an insert within tool access hole 165, laminates 110 and/or 110' will deflect angularly about an axis of rotation associated with rotor 100, such that clearances between protrusions 120 and 120' and magnets 115 may be eliminated. As described above, this may result in a deflection and/or deformation of protrusions 120 and 120'. Such a deflection and/or deformation then results in reactive forces exerted on magnets 115 through protrusions 120 and 120' (e.g., through edges, sides, or trunks thereof). One of ordinary skill in the art will recognize that in such an embodiment, protrusions 120 on the first plurality of laminates 110 may also be offset from protrusions 120' on second plurality of laminates 110' or may be in alignment based on the offset associated with tool access holes 165 and 165'. In addition, protrusions 120 and 120' may be symmetric, asymmetric, and/or any suitable shape. One of ordinary skill in the art will recognize that this is yet another exemplary depiction and is not intended to be limiting.

Throughout the present disclosure the term "at least one" is intended to include one and/or "a" single implementation of the referenced object or action. Further, it will be apparent to those skilled in the art that various modifications and variations can be made to the disclosed electric device rotor and methods for manufacture. Other embodiments will be apparent to those skilled in the art from consideration of the specification and practice of the disclosed systems and methods, for example rotor 100 may be external to a stator. It is intended that the specification and examples be considered as exemplary only, with a true scope being indicated by the following claims and their equivalents.

What is claimed is:

1. A rotor, the rotor comprising:
a first plurality of laminates each comprising a first keyway and a first tool access hole, and a first plurality of symmetric protrusions located at a periphery of each of the first plurality of laminates;
a second plurality of laminates each comprising a second keyway and a second tool access hole, and a second plurality of symmetric protrusions located at a periphery of the second plurality of laminates, wherein the first keyways are initially angularly offset from the second keyways, and the first tool access holes are initially angularly offset from the second tool access holes; and
a plurality of magnets, each magnet inserted between a channel formed between the first plurality of protrusions and the second plurality of protrusions, wherein reactive forces operate to hold the plurality of magnets, the reactive forces being caused by an angular offset of the first plurality of protrusions relative to the second plurality of protrusions based on a rotational deflection of at least one of the first plurality of laminates and the second plurality of laminates about a rotational axis, wherein each channel comprises a base having a convex form relative to a diameter of each laminate.

2. The rotor according to claim 1, further comprising a key inserted through each first keyway and each second keyway and a tool inserted through each first tool access hole and each second tool access hole to result in angular alignment of each first keyway and each second keyway and each first tool access hole and each second tool access hole.

3. The rotor according to claim 1, wherein a positive clearance exists between edges of the plurality of magnets and edges of the first plurality of protrusions or the second plurality of protrusions prior to insertion of the plurality of magnets.

4. The rotor according to claim 1, wherein an angular alignment of the first keyways and the second keyways and of the first tool access holes and the second tool access holes results in the angular offset of the first plurality of protrusions relative to the second plurality of protrusions.

5. The rotor according to claim 1, wherein the reactive forces are caused by insertion of a keyed shaft in the keyways of the first plurality of laminates and the second plurality of laminates, and wherein the first plurality of laminates are initially angularly offset from the second plurality of laminates.

6. The rotor according to claim 1, wherein the tool access holes of the first plurality of laminates and the second plurality of laminates are configured to receive an insert, wherein the reactive forces are caused at least in part by a relative rotation of at least one of the first plurality of laminates and the second plurality of laminates because of the insert received in the tool access holes.

7. A rotor, the rotor comprising:
a first plurality of laminates comprising a first plurality of protrusions located at a periphery of each of the first plurality of laminates;
a second plurality of laminates arranged differently from the first plurality of laminates around a shaft hole, the second plurality of laminates comprising a second plurality of protrusions located at a periphery of each of the second plurality of laminates,
wherein the first plurality of protrusions are asymmetric and the first plurality of protrusions are angularly offset from the second plurality of protrusions,
wherein the second plurality of protrusions are asymmetric and the second plurality of protrusions are angularly offset from the first plurality of protrusions; and
a plurality of magnets, each of the plurality of magnets being inserted into a channel formed between the first plurality of protrusions and the second plurality of protrusions, each channel having a base comprising a convex form,
wherein reactive forces operate to hold the plurality of magnets, the reactive forces being caused by:
deformations of the first plurality of protrusions and the second plurality of protrusions, the deformations being enabled based on the asymmetry of the first and second plurality of protrusions, and
an angular offset of the first plurality of protrusions relative to the second plurality of protrusions.

8. A method for manufacturing a rotor, the method comprising:
providing a first plurality of laminates each comprising a first keyway and a first tool access hole, and a first plurality of symmetric protrusions located at a periphery of each of the first plurality of laminates;
providing a second plurality of laminates each comprising a second keyway and a second tool access hole, and a second plurality of symmetric protrusions located at a periphery of the second plurality of laminates, wherein the first keyways are initially angularly offset from the second keyways, and the first tool access holes are initially angularly offset from the second tool access holes;

inserting each of a plurality of magnets into channels formed between the first plurality of symmetric protrusions and the second plurality of symmetric protrusions, each channel comprising a bottom having a convex form relative to a diameter of each laminate; and inserting a key into each of the first keyways and each of the second keyways and a tool into each of the first tool access holes and each of the second tool access holes, wherein the inserting causes a rotational deflection of at least one of the first plurality of laminates and the second plurality of laminates about a rotational axis, and wherein the rotational deflection results in reactive forces being applied on the magnets by at least one of the first plurality of symmetric protrusions and the second plurality of symmetric protrusions to hold the magnets on the laminates.

9. The method according to claim 8, wherein the inserting includes aligning a tapered end of the tool with the first and second tool access holes.

10. The method according to claim 8, further comprising installing a fastener in operable connection with the tool following insertion of the tool through the tool access holes in both the first and second plurality of laminates.

11. The method according to claim 8, wherein the key is part of a keyed shaft.

12. The method according to claim 8, wherein the tool is part of a tie rod.

13. The method according to claim 8, wherein the tool is configured to receive a fastener.

* * * * *